(12) United States Patent
Evans

(10) Patent No.: US 6,427,967 B1
(45) Date of Patent: Aug. 6, 2002

(54) VALVE, UNIT, ASSEMBLY AND SYSTEM

(76) Inventor: Rowland Frank Evans, 25 Dunlin Drive, Featherstone (GB)

( * ) Notice: Subject to any disclaimer, the term of this patent is extended or adjusted under 35 U.S.C. 154(b) by 0 days.

(21) Appl. No.: 09/232,559

(22) Filed: Jan. 15, 1999

(30) Foreign Application Priority Data

Jan. 29, 1998 (DE) .............................. PCT/GB97/01933

(51) Int. Cl.$^7$ ...................... F16K 31/365; F16K 31/40; F16K 3/42
(52) U.S. Cl. ................... 251/26; 251/30.02; 251/30.05; 251/45; 251/61.3; 251/61.4; 251/61.5
(58) Field of Search ............................... 251/26, 30.02, 251/30.03, 30.05, 33, 45, 46, 61, 62, 63.5, 63.6, 61.3, 61.4, 61.5

(56) References Cited

U.S. PATENT DOCUMENTS

| | | | | | |
|---|---|---|---|---|---|
| 862,867 | A | * | 8/1907 | Eggleston | 251/61 |
| 1,302,538 | A | * | 5/1919 | Gulick | 251/45 |
| 2,206,957 | A | * | 7/1940 | Hose | 251/26 |
| 2,417,994 | A | * | 3/1947 | Sheets | 251/26 |
| 2,587,357 | A | * | 2/1952 | McPherson | 251/26 |
| 2,587,733 | A | * | 3/1952 | Jones | 251/26 |
| 2,707,970 | A | * | 5/1955 | Hughes | 251/26 |
| 2,925,984 | A | * | 2/1960 | Kowalski | 251/26 |
| 3,010,691 | A | * | 11/1961 | Canfield | 251/26 |
| 3,075,737 | A | * | 1/1963 | Cantalupo et al. | 251/26 |
| 3,391,897 | A | * | 7/1968 | Wilson | 251/26 |
| 3,533,434 | A | * | 10/1970 | Smith | 251/26 |
| 3,862,738 | A | * | 1/1975 | Stumpmeier | 251/26 |
| 4,120,478 | A | * | 10/1978 | Hasegawa | 251/26 |
| 4,149,565 | A | * | 4/1979 | Jennings et al. | 251/26 |
| 4,706,930 | A | * | 11/1987 | Lexen | 251/26 |
| 4,981,280 | A | * | 1/1991 | Brandenberg | 251/26 |

FOREIGN PATENT DOCUMENTS

SE 162185 * 2/1958 ................. 251/26

* cited by examiner

Primary Examiner—George L. Walton
(74) Attorney, Agent, or Firm—Albert O. Cota

(57) ABSTRACT

The invention relates to a valve incorporating a flexible diaphragm, and improves upon known diaphragm valves to permit the use of a diaphragm-controlled valve in systems for which such valves were not previously suitable or utilized. There is provided a valve which includes a housing (2, 3, 34) having a hollow interior within an outer housing surface (31), a diaphragm (1a, 1b) extending across the interior and creating a diaphragm control chamber (10) within the interior, a valve seat (4) against which a part (1a) of the diaphragm can seal, a first conduit (5) leading around at least part of the valve seat, a second conduit (6) leading to within the valve seat, and a diaphragm control means (8, 9, 91, 92, 101, 111, 112), wherein the diaphragm control chamber is isolated from the first and second conduits. A valve unit and a lower control system are also disclosed, utilizing one or more valves as herein described.

14 Claims, 8 Drawing Sheets

VALVE, UNIT, ASSEMBLY AND SYSTEM

FIELD OF THE INVENTION

This invention relates to a valve, unit, assembly and system.

In this specification geometrical terms such as upper, lower, right, left are to be understood as applying to the orientation of a valve as viewed in FIG. 1.

The same numbering is used on different drawings for the same functional parts.

BACKGROUND TO THE INVENTION

Valves are widely used in industry as on-off valves for controlling the flow of liquids and gases in a pipeline, and alternatively from a pipeline and into a branch line. A valve with widespread use is a diaphragm valve in which a diaphragm is clamped in a hollow housing by their outer periphery in a manner to inhibit leakages around that periphery, and in use operates by flexure of an inwards portion of the diaphragm into and out of engagement with a valve seat. An advantage of a diaphragm valve over alternatives (such as ball valves, piston valves and butterfly valves, for example) is that it requires a lesser amount of accurate machining, and so can be cheaper to manufacture—for example, the piston and cylinder of a piston valve need to be very accurately machined to prevent leakages and cross-binding. Another advantage is that the opening and closing of the valve is controlled by the relative pressures at its inlet and outlet, so that large forces or torques are not required to operate the valve.

A valve "unit" is used when the flow into (or from) a branch pipe is to be controlled by a single diaphragm valve, or more usually when the flow into (or from) several branch pipes is independently to be controlled by several diaphragm valves.

A valve "system" as described herein requires the use of at least one on-off valve. Such systems include those with a requirement for an intermittent fluid flow, including for instance a processor such as an injection mould with a requirement for intermittent coolant flow i.e. the mould needs to be cooled at least once each cycle in order to maintain the, mould temperature within an acceptable temperature range despite the mould receiving regular injections of hot plastics material (for the manufacture of plastics product). Other systems require intermittent liquid: or gas dispensing, or timed mixing.

DISCLOSURE OF THE PRIOR ART

A known diaphragm valve is shown in FIG. 1; in this known embodiment the valve is assembled from three parts—an upper body, part, a lower body part and a circular diaphragm clamped by its outer periphery between the upper and lower body parts. The upper and lower parts when placed face-to face form a hollow interior defined by internal surfaces within an outer (externally exposed) valve housing surface; the diaphragm is trapped by its outer perimeter between the body parts to extend across the hollow interior to form upper and lower chambers. The upper chamber (above the diaphragm) is connected to the inlet conduit by a side-porting to permit pressure equalisation to opposite sides of the diaphragm; this porting could however alternatively be an aperture through the diaphragm, the through-diaphragm aperture being the usual arrangement for most known diaphragm valves. The upper chamber is also connected by "internal" porting to the valve outlet (second) conduit, this porting including a control valve.

The diaphragm is flexible, and is usually made of rubber or a suitable plastics material. It can be strengthened by a metal plate, to prevent excessive wear by the valve seat.

A typical array of diaphragm valves for independent control of flow into several branch lines is shown in FIG. 2.

A valved system for coolant flow to and from a processor such as an injection mould is disclosed in Delcroix U.S. Pat. No. 5,437,304. The Delcroix system however uses coupled mechanical valves which require a relatively large and localised operating force i.e. a force which needs to be applied as by an operating lever or handle positioned closely to the valve(s). We believe that the requirement for a large operating force makes the Delcroix system unsuitable for larger valves, and the requirement that the force be applied close to the valve(s) may not be convenient in certain applications.

DISCLOSURE OF THE INVENTION

From a first aspect the invention teaches a valve which includes a housing having a hollow interior within an outer housing surface, a diaphragm extending across the interior and creating a diaphragm control chamber within the interior, a valve seat against which a part of the diaphragm can seal, a first conduit leading around at least part of the valve-seat, a second conduit leading to within the valve seat, and a diaphragm control means, characterised in that the diaphragm control chamber is isolated from the first and second conduits.

From a second aspect the invention teaches a valve which includes a housing having a hollow interior within an outer housing surface, a diaphragm extending across the hollow interior to form an upper and a lower chamber, the diaphragm separating the upper chamber from the lower chamber, the lower chamber including a valve seat against which a part of the diaphragm can seal, a first conduit leading into the lower chamber and around at least part of the seat, a second conduit leading into the lower chamber and within the valve seat, a first porting leading into the upper chamber, the first porting including a control valve, characterised in that the first porting extends to an outer surface of the housing.

In an arrangement according to another aspect, the valve includes a second (prior art) porting which leads from one of the conduits and into the upper chamber, the second porting being of smaller cross section than that of that conduit. Operation of the diaphragm in this arrangement can thus in part be made dependent upon the pressure in that conduit i.e. the second porting allows, gradual pressure equalisation to opposite sides of the diaphragm such that the pressure above the diaphragm in the absence of a pilot pressure is the same as that below an outer annulus of the diaphragm or as that below a central area of the diaphragm.

When the second porting is omitted, diaphragm can be made responsive only to pressure supplied by the first porting by way of the control valve i.e. the diaphragm is driven by supplied external pressure.

An advantage of the valve according to the invention is that the first porting, can be connected to an independent control pressure, so that movement of the diaphragm against and away from the seat, and thus flexure of the diaphragm between the non-flow/conditions (between the first and second conduits) can be made dependent upon the operational position of the control valve, and in particular can be controlled by a pilot pressure in accordance with the selected on/off position of the control valve. Specifically, the pilot pressure is independent of, and can be provided by a different fluid from, that flowing in the first and second conduits. The control valve can be operated, usefully from a remote location, by any known means, including gaseous (e.g. pneumatic), liquid and electro-magnetic. Also, the valve can be bi-directional, with flow from the higher pressure conduit towards the lower pressure conduit being controlled by the valve irrespective of whether the higher pressure conduit is the first conduit or the second conduit.

Such a valve can offer the advantages of a diaphragm valve in systems which have heretofore exclusively utilised more expensive and complex mechanical valves.

In a preferred arrangement the pressure supplied to and by the pilot valve can be the higher of two available pressures. Thus the diaphragm control chamber of a valve as herein defined can be connected to a pressure selection means having a plurality of inlets connected to respective independent pressure sources, the pressure selection means automatically transmitting the highest source pressure to the chamber.

The pressure selection means can be connected to the fluid source of the valve inlet (and in certain embodiments also to a fluid source connected to its outlet), and also to an external independent pressure source, and will ensure that the pressure in the diaphragm control chamber always exceeds the pressure at the inlet and outlet, so that the position of the valve can be maintained open or closed as desired, regardless of changes in the source pressure(s).

The diaphragm control means can be a pilot valve within the valve housing, or one remote from the valve housing and connected thereto by a pressure line.

From a third aspect the invention teaches a valve unit, each unit including a valve having a housing which includes outer surfaces and within which is an upper and a lower chamber, a diaphragm separating the upper and the lower chamber, the lower chamber including a valve seat against which a part of the diaphragm can seal, a first conduit with first and second ends and with the second end leading into the lower chamber and around at least part of the seat, a second conduit leading into the lower chamber and within the valve seat, a first porting leading into the upper chamber, the first porting including a control valve, characterised in that a first end of each first conduit is joined to a flow-passageway at a position part-way along the passageway, and in that the ends of the passageway are formed to interconnect with a passageway of another valve unit so as to permit a modular valve assembly.

As with the prior art arrangement, the valve unit can include a second porting leading from the first conduit into the upper chamber, the second porting being of smaller cross-section than the first conduit.

The individual passageways can be connected to form a pipeline, usually open-ended but alternatively with the passageway of one valve unit being blanked off so that the pipeline becomes closed-ended at that valve unit; the major medium flow will occur along the pipeline and continue through the passageways towards another (downstream) valve. The valves can be pilot operated, individually and perhaps in sequence, to allow each respective diaphragm to lift from its seat whenever medium needs to be tapped off from the pipeline i.e. specifically from its respective passageway, and fed to and through the second conduit and out of that valve; if the second conduit is connected to a second pipeline the valve can achieve controlled medium transfer between the first and second pipelines. Alternatively, it can be arranged that the medium flows from the second conduit through the valve and into the passage-way and first pipeline, for instance for pilot-controlled mixing or dosing applications.

An advantage of such a unit when the diaphragm housing also embraces a through-passageway which can form part of a pipeline i.e. when one or more units are mounted in-line between pipe sections, is a reduced number of leak, points i.e. as compared with fitting a known diaphragm valve such as that of FIG. 1.

The valves can however alternatively be spaced apart individually along a pipe, with their respective ends joined to intermediate pipe sections.

From a fourth aspect the invention teaches a flow control system for a processor which includes a processor inlet valve and a processor outlet valve characterised in that at least one of the valves is a valve as described herein. Preferably, there is a processor dump valve connected upstream of the outlet valve and at least the processor outlet valve and the dump valve are controlled by a (common or independent) pilot valve whereby the dump valve can be in the closed condition when the inlet and outlet valves are in the open condition and whereby the dump valve can be in the open condition when the inlet and outlet valves are in the closed condition.

Preferably, the processor inlet valve is also controlled by a pilot valve. Preferably also, a single pilot valve controls at least one, and usefully all, of the processor valves. The processor valves can be operated sequentially or substantially simultaneously by the pilot valve.

Desirably, the pilot valve(s) is(are) remote from each respective valve.

An advantage of this system when connected to a processor such as an injection mould (to control the flow of coolant to and from the processor) is that when the mould is to be changed and the inlet and outlet valves are closed, the dump valve can be opened so as to allow sufficient of the flow medium (such as liquid coolant) trapped in the processor to be taken off in controlled fashion whereby to allow the pressure of the trapped coolant to drop to ambient. Thus the "back-pressure" trapped in the mould when the outlet valve was closed can be reduced, so that when the mould is subsequently disconnected from the inlet/outlet valves the coolant does not eject forcibly from the processor. The pilot valves can be controlled from adjacent the position from which the mould is to be disconnected, allowing both operations to be supervised and/or effected by one operator, even though the dumped coolant can be received and/or stored at a different position e.g. to the rear of the processor.

BRIEF DESCRIPTION OF THE DRAWINGS

The invention will be further described by way of example with reference to the accompanying schematic drawings, in which.

DESCRIPTION OF THE PREFERRED EMBODIMENTS

Figure 1:
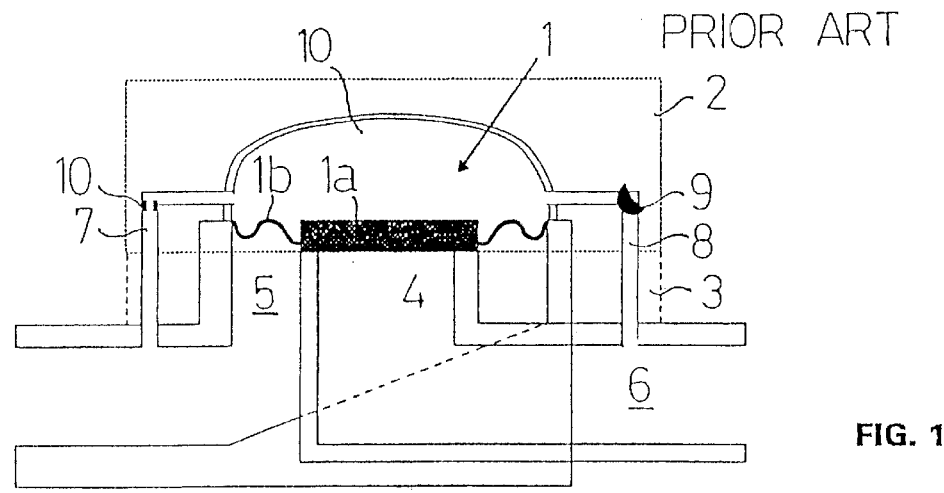
FIG. 1 is of a known diaphragm valve.

The diaphragm 1 of the "prior art" diaphragm valve of FIG. 1 has its circular outer peripheral edge trapped between upper housing part 2 and lower housing part 3. Lower housing part 3 includes an annular seat 4 with which an enlarged wear-resistant portion 1a of diaphragm 1 is engaged, so that as viewed the valve is in the closed condition with inlet conduit 5 isolated from outlet conduit 6.

Flexible portion 1b of diaphragm 1 permits the diaphragm to be lifted from seat 4, to open the valve so as to provide a flow connection between inlet conduit 5 and outlet conduit 6. The diaphragm can be resiliently biassed in a direction to assist closure (as for spring 30 of FIG. 3), or in a direction to assist valve opening (as for spring 40 of FIG. 4).

Upper housing part 2 includes a second porting 7 connected to inlet conduit 5, by which the upper diaphragm control chamber 10 is permanently connected to the inlet conduit 5. Upper housing 2 also has a first porting 8 which includes a pilot valve 9. Control or pilot valve 9 is shown in the closed condition and in this condition isolates the upper valve chamber 10 (i.e. the chamber above the diaphragm 1 as viewed) from the outlet conduit 6. With the pilot valve 9 in this condition, the diaphragm valve is held closed, with the diaphragm portion 1a against the seat 4; thus, the pressure in the inlet 5 (which is greater than the pressure at the outlet 6) acts against the diaphragm 1 from both sides, but the increased area against which it can act from above (defined by the area enclosed by the seat 4), causes the resultant force to urge it downwardly towards the seat 4.

In this embodiment second porting 7 includes a restriction 10, so that the rate of inflow into the upper valve chamber along the second porting 7 from inlet conduit s will be less than the rate of permitted outflow along porting 8 into the outlet conduit 6. Thus when pilot valve 9 is moved to its open condition the pressure in chamber 10 quickly drops to that of the outlet 6, until the upward force on the diaphragm (the product of effective pressure and area) exceeds the downward force, causing the diaphragm to lift and open the valve. When subsequently the pilot valve is moved to the closed condition shown the pressure above the diaphragm gradually rebuilds through porting 7, until the diaphragm is pressed downwardly against seat 4, back to the position shown in FIG. 1.

This diaphragm valve relies upon the pressure in outlet conduit 6 being lower than in inlet conduit 5 i.e. it is uni-directional and requires a differential pressure, of above a threshold value. However, the second porting 7 can become blocked by dirt (particulates) or fibres, so that filters are conventionally used in the supply line; but these filters can themselves become blocked and cause pressure reductions as well as flow restrictions.

Figure 2:
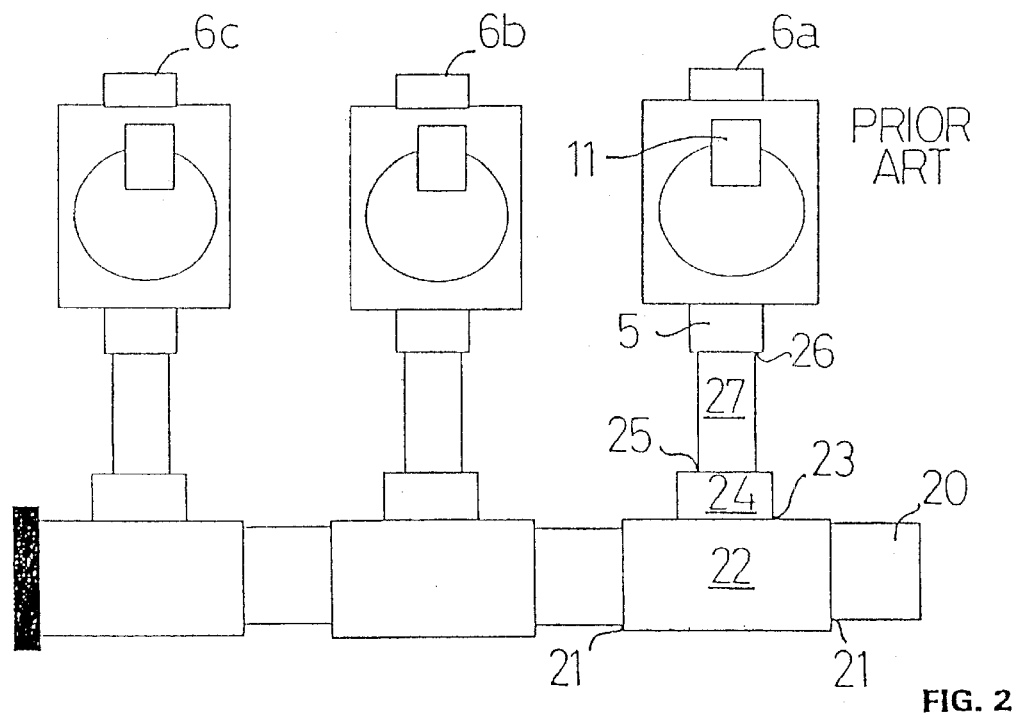
FIG. 2 is of a known array of diaphragm valves for independent control of the flow into several branch lines.

The pilot valve 9 is connected to external operating means 11, as shown in FIG. 2, as will be well known to those skilled in this art.

The prior art array of diaphragm valves of FIG. 2 allows the liquid or gas in pipeline 20 to flow (or not flow) into one or more of outlet conduits 6a,6b,6c. The valves can be independently controlled in accordance with the position of the respective, control valve 9 (FIG. 1), so that the array is suited for selected dispensing of liquid from the pipeline 20, perhaps for mixing with a solid or another liquid downstream of the respective outlet conduit. A disadvantage of this array is however the number of potential leak points for each fitted valve i.e. at positions 21 where the pipe insert 22 joins into pipeline 20, at position 23 where the spur pipe e4 is connected to the pipe "insert" or extension 22, and at positions 25 and 26 where the connector pipe 27 is respectively joined to the spur pipe 24 and to the inlet conduit 5. Thus there are five potential leak points for each valve fitted i.e. fifteen potential leak points for this (small) three-valve array; for an alternative embodiment with eight valves there are forty additional leak points arising from the piping joints or connections.

Figure 3:
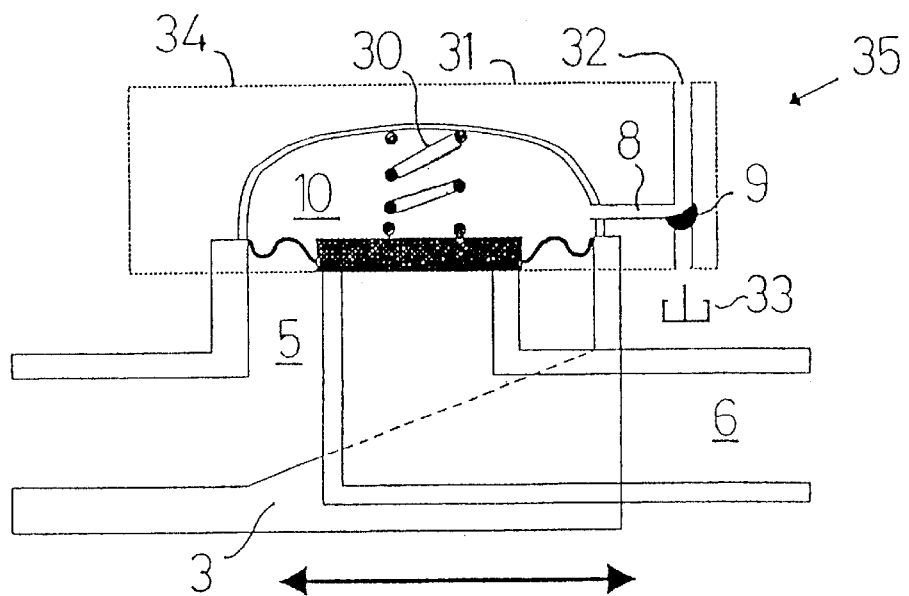
FIG. 3 is of a valve according to the invention

A valve 35 according to the invention, is shown in FIG. 3. In this embodiment first porting 8 extends to the external surface 31 of upper housing, 34, to terminate at housing opening 32. Pilot valve 9, which as shown is a three-way, two-position rotary valve, acts alternately to interconnect and disconnect the upper diaphragm control chamber 10 and the exit of porting 8 at housing opening 32. Thus the upper chamber 10 can conneted to a (clean) external pressure source such as that denoted by reference numerals 67,68 in FIG. 6, so that operation of the diaphragm when pilot valve 9 is in the open condition is not dependent upon the pressure either in inlet conduit 5 or in outlet conduit 6.

Since the operation of the valve 35 is independent of the inlet and outlet pressures, the valve is bi-directional.

The drain 33 from the upper valve chamber can be connected to the pilot valve supply. Thus as compared to the prior art valve of FIG. 1 this valve can be bi-directional i.e. if required the conduit 6 can be connected to the source of fluid inflow whilst the conduit 5 can be connected to the exit for fluid outflow from the valve; alternatively, this valve will operate even if (inadvertently) "reverse" connected to the pipeline 20.

Since the drain 33 is outside the valve housing, this drain could be replaced by a vacuum sources, so that in the open condition of pilot valve 9 the upper valve chamber would be at a pressure below atmospheric, and so the diaphragm will be in its raised (open) condition even though the pressures in the conduits 5,6 might also be below atmospheric (provided that the net force on the diaphragm is upwards); but if an external vacuum source is not available a spring 40 (FIG. 4) can be fitted, instead of the spring 30 shown.

Also, since in this embodiment the drain 33 is outside the valve housing, if the pilot pressure is above-atmospheric, drain 33 could be removed to allow the pilot fluid to drain to atmosphere. Instead of to drain 33, the branch from porting 8 could be connected into the outlet conduit 6, as for the prior art valve of FIG. 1 i.e. at the concealed surfaces forming an interface between the upper 2 and lower 3 housing parts.

In an alternative arrangement the pilot valve 9 is solenoid operated, to be axially movable as viewed into and out of the paper.

In a further alternative embodiment the pilot valve 9 is a pressure-regulating valve, permitting the pressure in the upper valve chamber to be changed so that the diaphragm opens and closes to vary the flow rate between the inlet conduit 5 and outlet conduit 6, or to control the maximum allowed fluid pressure in inlet conduits. Alternatively, bias spring 30, or bias spring 40, can be made adjustable for the same purposes.

Figure 4:
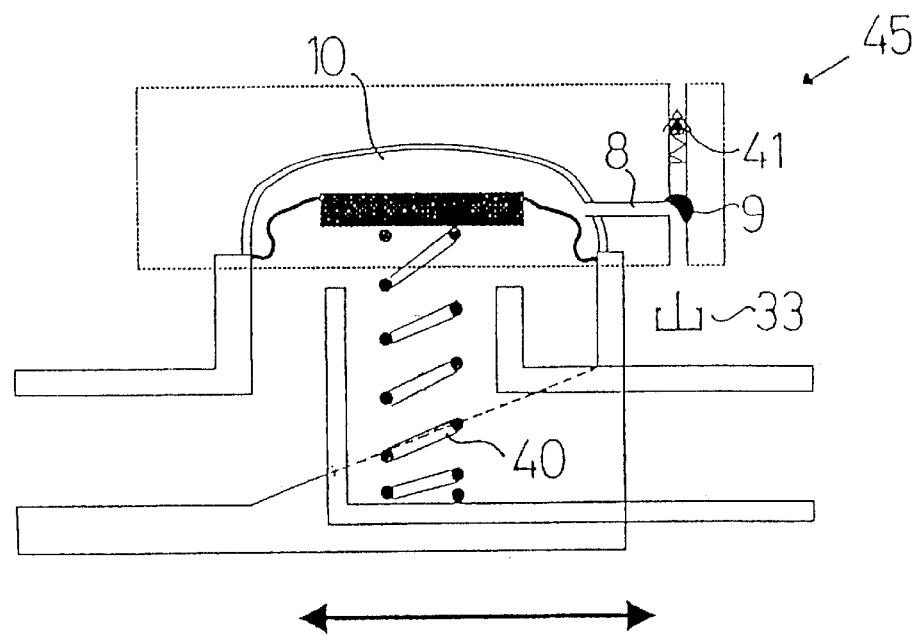
FIG. 4 is of an alternative embodiment of valve.

In the embodiment of valve 45 of FIG. 4 there is a one-way valve 41 in porting 8 upstream of pilot valve 9. This one-way valve 41 can prevent fluid from drain 33 entering the pilot (clean) supply, and can also act to prevent the valve chamber 10 from decompressing (and so opening the diaphragm prematurely) should there be an unexpected failure of the pilot pressure.

Figure 5:
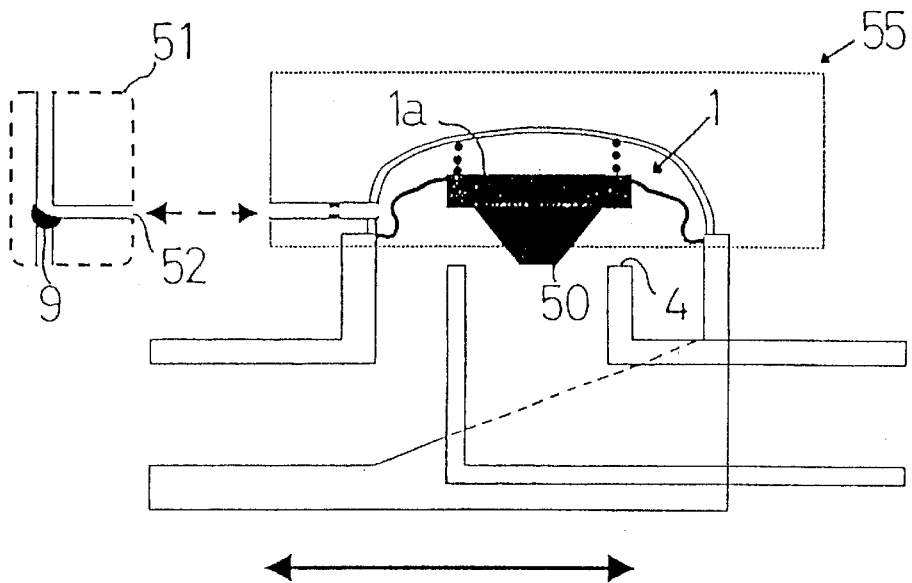
FIG. 5 is of a modified valve, with a remote control (pilot) valve connected thereto.

FIG. 5 is of a modified valve 55, the portion 1a of the diaphragm carrying an integral frusto-conical extension 50 which in the closing condition of the valve limits the gap between the valve seat 4 and diaphragm 1 to provide a variable restriction and permit intermediate flow rates between the valve open and valve closed positions. As also seen the pilot valve 9 is in this embodiment itself at a remote position, outside the valve housing, in its own housing 51, with outlet 52 to the upper diaphragm chamber.

Figure 6:
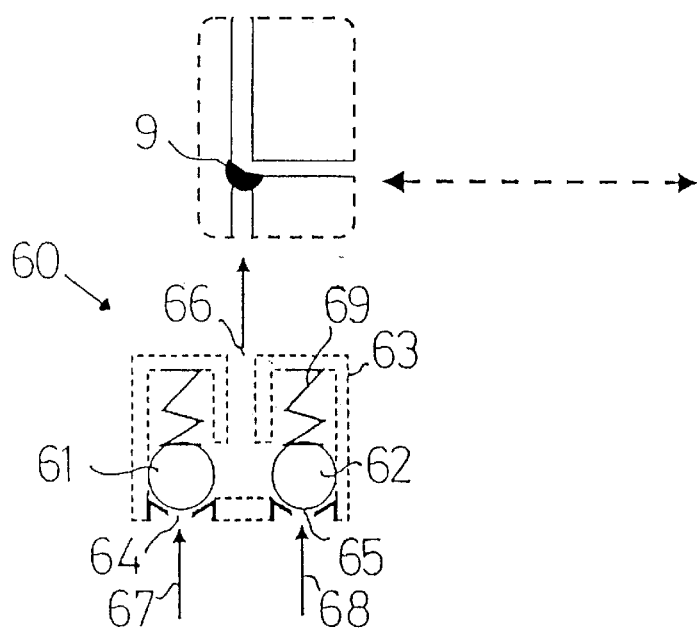
FIG. 6 is of part of the pilot valve arrangement, with a pressure selection means upstream of the pilot valve.

FIG. 6 shows another aspect of the invention—the use of a pressure selection means, or "flow or gate" arrangement, 60. The arrangement 60 comprises two one-way valves 61,62 which in this embodiment are provided in a single housing 63 (shown for clarity schematically and in dotted outline), the housing having two inlets 64,65 and a single exit 66. The inlets 64, 65 in use are connected to respective pressure lines 67,68. The springs 69 which bias the valves 61,62 to their closed condition are very light, so that it is the relationship between the pressure within the housing 63 and at the inlets 64,65 which automatically, determines whether the respective valve 61,62 is open. It will be understood that if the pressure at inlet 64 is higher than that at inlet 65, the valve 61 will be open and the valve 62 will be closed, so that the pressure within the housing 63, and that transmitted through exit 66 (in this application to the pilot valve 9) is substantially the same as the pressure at the inlet 64, i.e. substantially the same as the higher of the pressures in the two pressure lines. If the pressure at the inlet 64 drops to below that at the inlet 65, valve 62 opens and valve 61 closes; the pressure at the exit 66 drops to substantially the same as the pressure at the inlet 65, which has become the higher of the pressures in the two pressure lines 67,68.

In another embodiment the one-way valves are inset into the two pressure lines, but again with the connections such that it is possible for the pressure in each line to act against the one-way valve in the other line in a direction to ensure that the higher pressure is transmitted via the exit line. The flowable medium in the two inlet lines may be different; the medium in the housing and also in the exit line is then likely to be a mixture i.e. if the pressures change so that the pressure in one line varies and so is not always the higher— as may be the case if the medium in one or both lines has other uses e.g. as part of the water supply for a factory or other establishment. One or both of the flowable mediums may be compressible.

It will be understood that the valves 61,62 also act as non-return valves, so that the fluid within the "flow or gate" 60 cannot pass along either of the lines 67,68; should the fluid within the "flow or gate" become a mixture of the fluids from lines 67 and 68, the lines 67 and 68 are isolated from this mixture and maintained clean.

Figure 12:
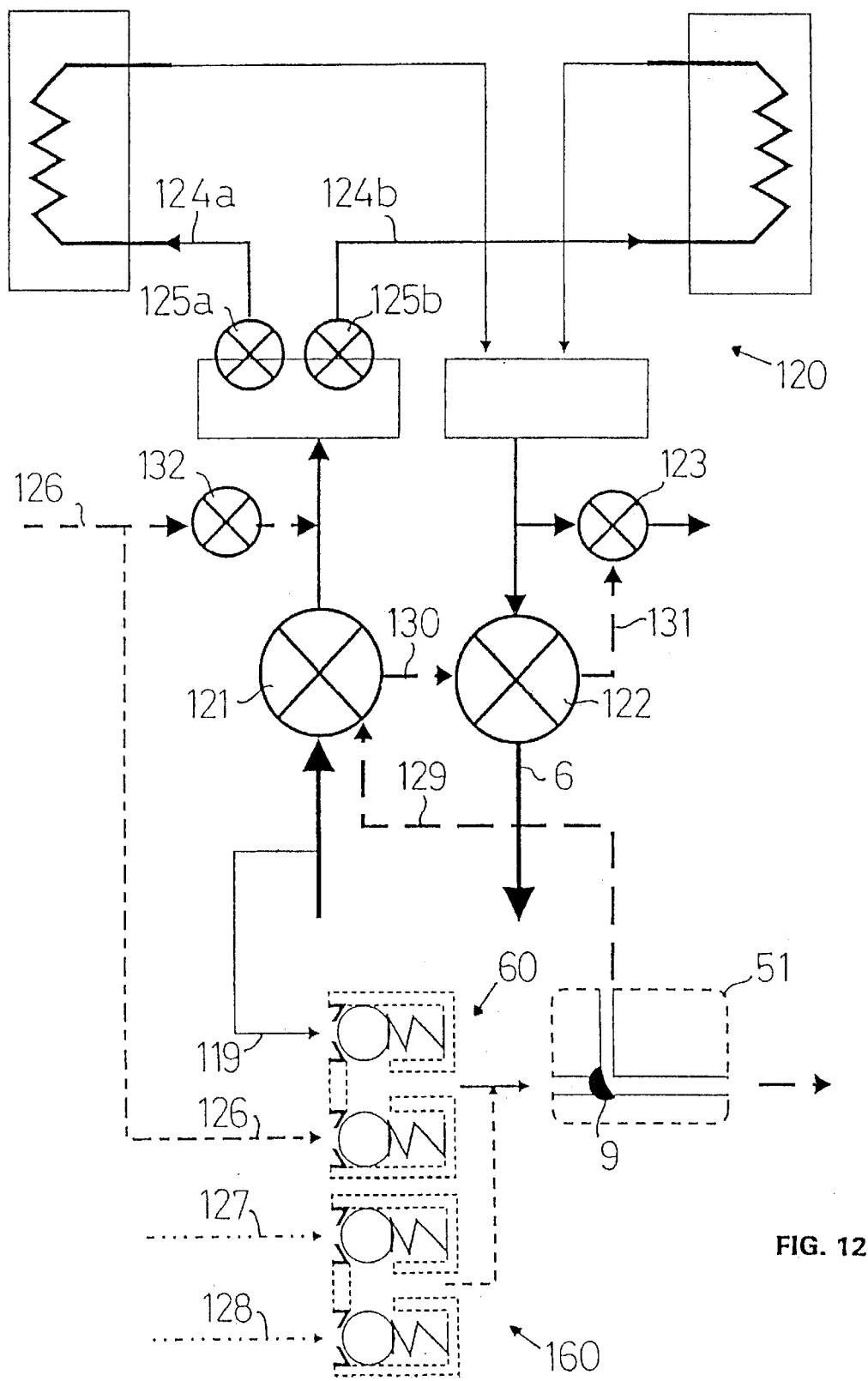
FIG. 12 is of a flow control system.

In an alternative embodiment the "flow or gate" unit 60 could include more than two one-way valves, again connected so that the highest pressure supplied to the unit is the pressure (allowing for unit transfer losses) applied to (or transmitted to) the pilot valve 9 (see for example the unit 60 of FIG. 12).

Figure 7:
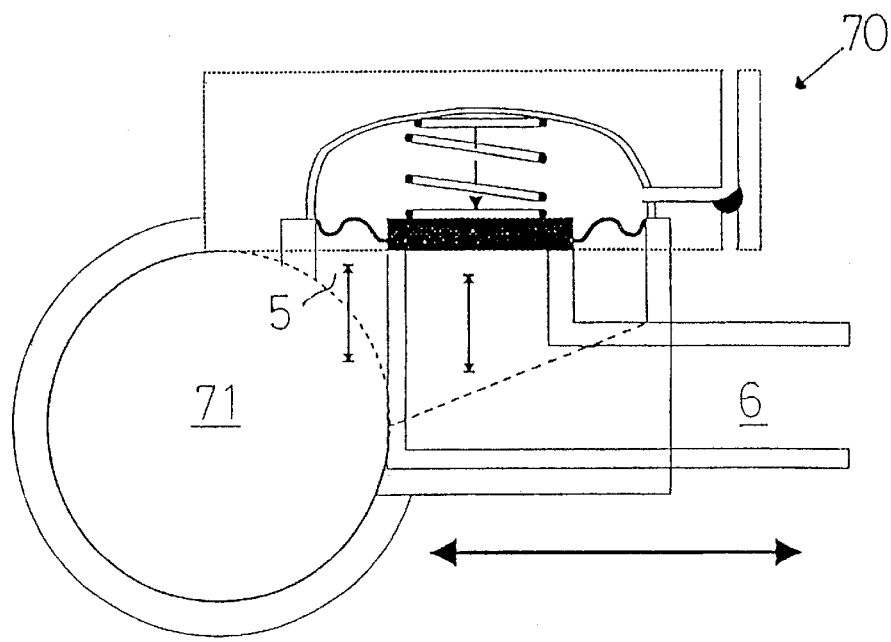
FIG. 7 is of a valve unit according to the invention, in the valve closed condition.

FIG. 7 is of a valve unit 70 according to the invention. The inlet conduit 5 is connected to, preferably breaks into, a transverse flow passageway 71. The ends of passageway 71 are screw-threaded, with the thread finishing internally such that when the facing passageway of each of two valve units are screwed tightly on to a correspondingly threaded coupling 80 (FIG. 8) the two valve units adopt the same angle relative to the connector and lie with their side faces sandwiching a gasket or other sealing means. The threads on the passageway 71 are standard threads, so that the valve unit(s) can be used to branch off, or branch into, a pipeline with minimum difficulty. The passageway 71 is of larger diameter that the outlet conduit 6, so that more than one valve can be fitted to a common pipeline without the pressure drop across one (open) valve unit significantly affecting the other valve unit(s).

Figure 8:
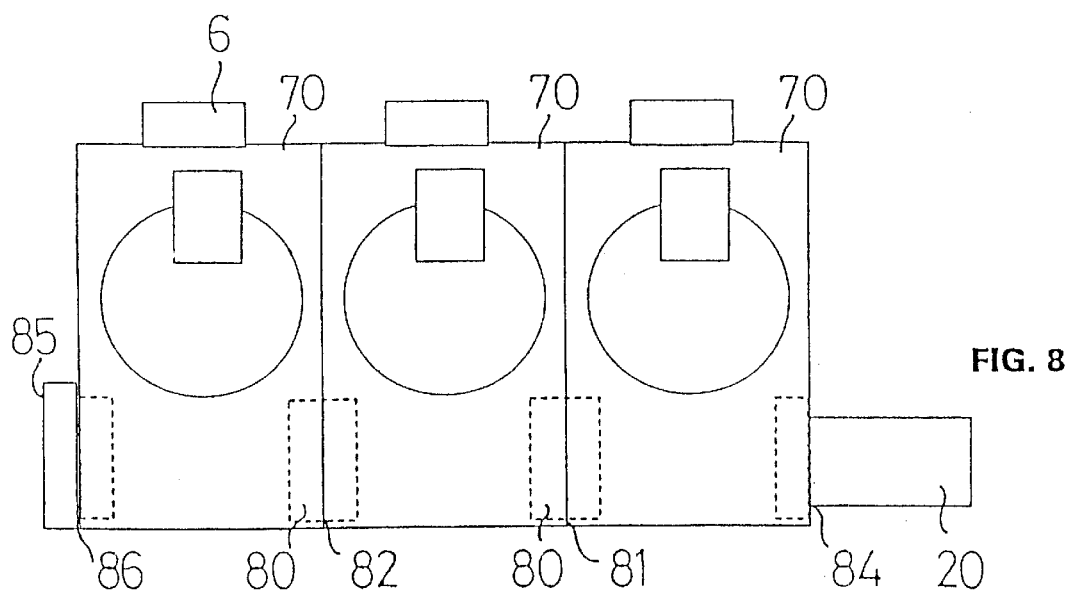
FIG. 8 is of an array of three of the valve units of FIG. 7.

FIG. 8 shows three valve units 70 according to FIG. 7 affixed together by way of a pair of threaded connectors 80 to form a modular array. There are four leak points introduced by such affixing i.e. one between each pair of valves at positions 81 and 82, one between the passageway 71 and the pipeline 20 at position 84, and one between the passageway 71 and the threaded end plug 85 at position 86. For an alternative embodiment with eight valves there are thus (only) nine added leak points at the piping joints or connections, compared to forty with the prior art arrangement similar to that of FIG. 2.

In the embodiment shown, the valve units 70 are at the end of pipeline 20, with the remote end (to the left as viewed) of the passageways through the respective valves closed off by the plug 85, though in an alternative embodiment the plug 85 could be replaced by another length of pipeline.

The flow through the valve(s) can be in either direction i.e. the passageway 71 can be used as a collector for the fluid streams in flowing from conduits 6, so that the valve units can act as dosing or mixing valves introducing metered quantities off fluid into the common pipeline 20. Alternatively, the valve units 70 can be directed to act as a distributor for fluid from pipeline 20.

Figure 9:
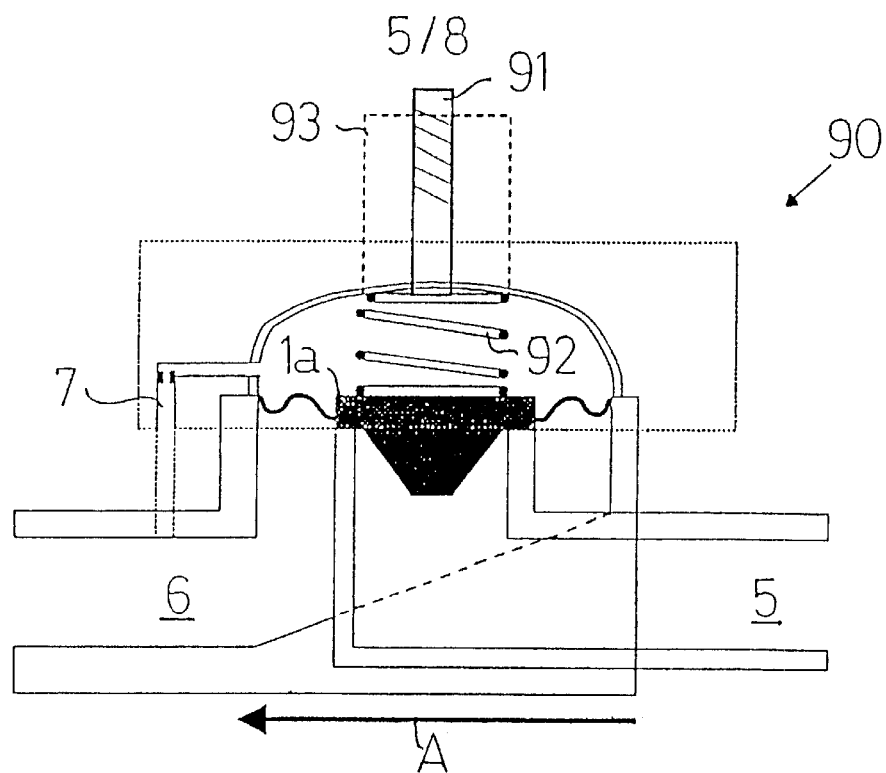
FIG. 9 is of a modified valve, mechanically adjustable.

FIG. 9 is of an alternative valve 90 with a mechanical "pilot" control 91, used in conjunction with spring 92. In this embodiment pilot control 91 is threadedly mounted in a housing part 93 and can be rotated therein to bear more or less heavily on spring 92, so that the pilot control 91 in this embodiment is adjustable. Unlike the embodiments of FIGS. 3–5, the valve 90 is uni-directional, flow being permitted only from the conduit 5 to the conduit 6 (in the direction of arrow A. Porting 7 is provided to permit the introduction/ escape of fluid from the chamber 10. The porting 7 can be open to atmosphere in which case the valve operates as a "gauge pressure valve" responsive to pressures at the inlet 5 relative to atmospheric. Alter natively, and as shown in dotted outline, the porting 7 can be connected to the outlet conduit 6 in which case the valve operates as a "differential pressure valve" responsive to differences in the pressures at the inlet 5 and outlet 6. The combination of the force generated by the pressure in the chamber 10 and the (variable) force of the pilot control 91 acting against the force generated by the outlet pressure against the underside of the diaphragm portion 1a determines whether the valve is open or closed.

Figure 10:
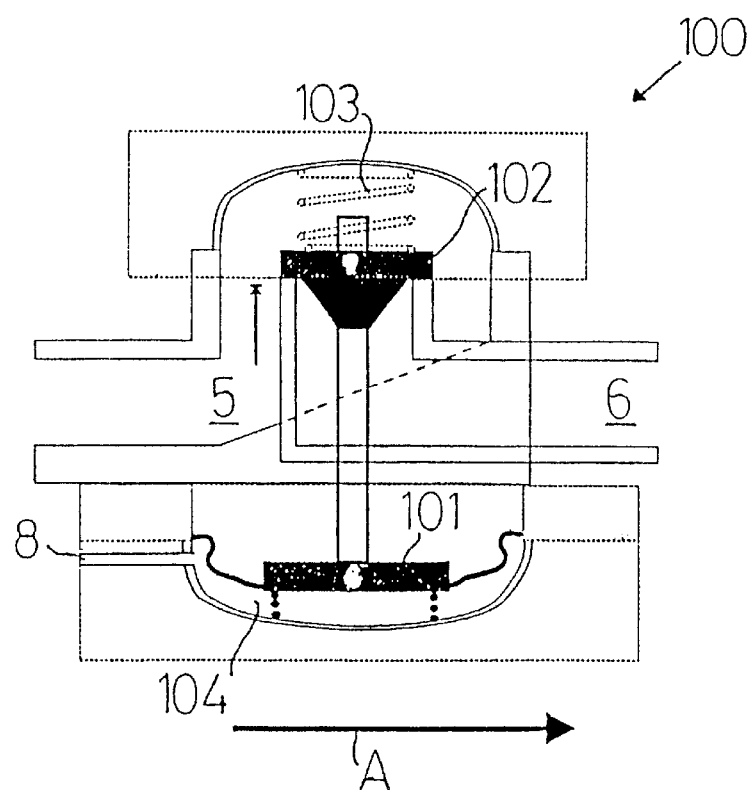
FIG. 10 is a sealing valve connected to a diaphragm.

FIG. 10 is of a sealing valve 100 connected to a diaphragm 101. The pilot pressure is applied through port way 8 to one side of a diaphragm 101 which is mechanically coupled to a sealing valve part 102. In this embodiment at resilient force from bias spring 103 is constantly applied (downwardly as viewed) to the sealing valve part 102 in a direction to urge the sealing valve part 102 into a closed condition; but in an alternative embodiment, with a different set of forces (from the controlled fluid which is to flow between conduits 5,6) a spring acts on the sealing valve part 102 in the opposite direction.

With the bias spring 103 fitted, the sealing valve 100 is to a limited degree bi-directional, i.e. it will function if the pressure in conduit 5 exceeds the pressure in conduit 6, and also if the pressure in conduit 6 exceeds the pressure in conduit 5 by an amount insufficient to overcome the bias of spring 103 (and also any vacuum introduced to chamber 104 via portway 8). Without spring 103, the valve is substantially uni-directional for fluid flow in the direction of arrow A.

As will be understood by those familiar with diaphragm and similar valves the direction and size of the complementary or opposing spring force, is selected in accordance with the forces expected on the diaphragm from its area and the pressures to which it is subjected.

Figure 11:
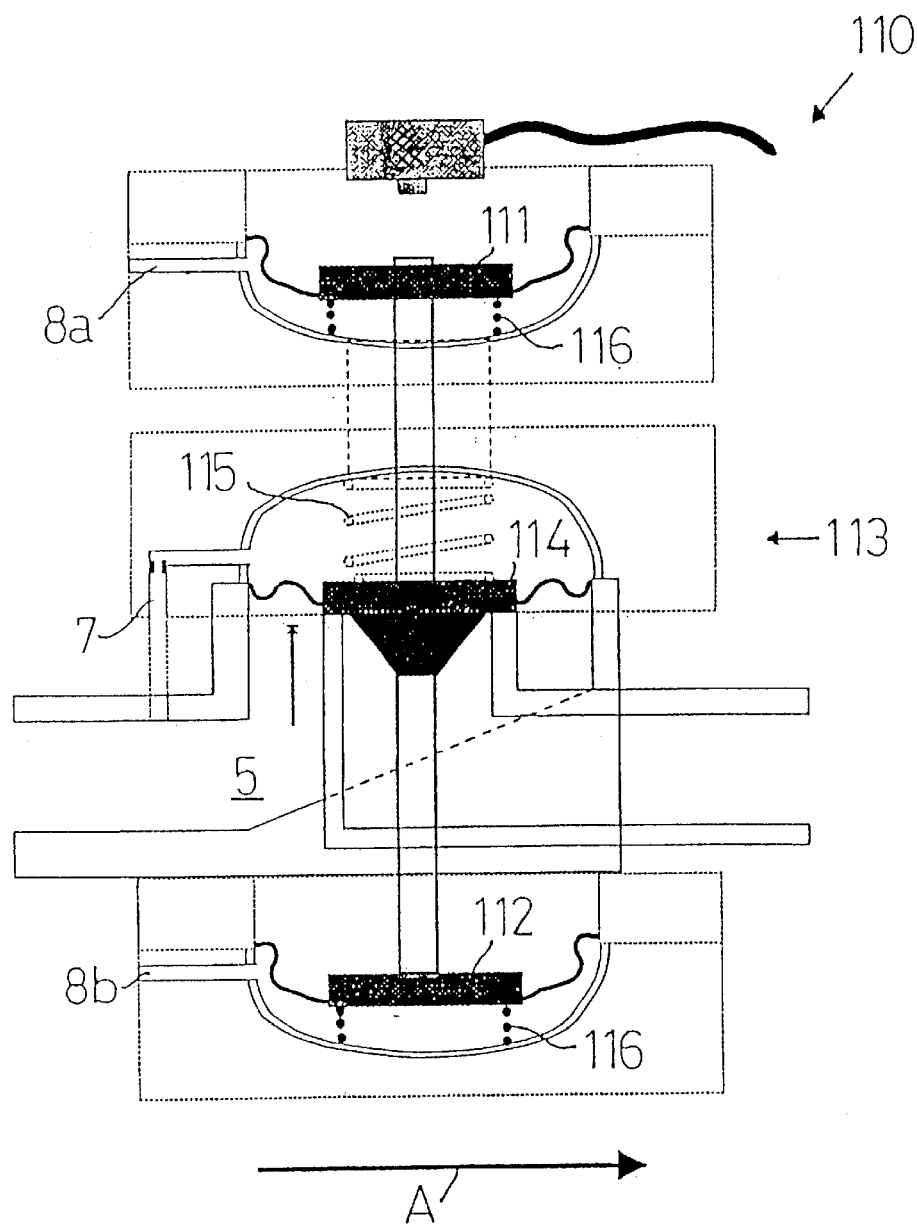
FIG. 11 is of yet another alternative embodiment of valve.

In the valve 110 of FIG. 11, two diaphragms 111 and 112 are mechanically connected to a sealing valve 113. In this embodiment, the sealing valve 113 also has its own diaphragm 114, and the chamber above the diaphragm 114 connected by a portway 7 either to atmosphere or to the conduit 5 (as shown in dotted lines) as with the embodiment of FIG. 9. In another embodiment, however, the sealing valve is not a diaphragm valve, i.e it is similar to the sealing valve part 102 of FIG. 10, so that diaphragm 114 and portway 7 are not present. Pilot pressure can be fed through portways 8a,8b to the underside of the diaphragms 111 and 112; if the pilot pressure is sufficient the sealing valve 113 will be lifted from its seat, permitting fluid to flow from the inlet 5 to the outlet 6. Because the pilot pressure acts on the combined surface area of both diaphragms 111 and 112, it will be understood that the pilot pressure in this embodiment can be lower than the pressure in the inlet 5, and yet the sealing valve 113 can still be opened. Spring 115 (shown in dotted outline) and spring 116 act (in opposed directions) on the sealing valve 113 and on the diaphragms 111,112 respectively, the relative strength of the springs being chosen so as to bias the sealing valve closed. In an alternative embodiment, one or both of springs 116 are not present.

The embodiment of FIG. 11 is also bi-direction to a limited degree, in that the relationship between the (optional) spring 115 and the spring 116 determines the difference in pressures which will open the valve 113 for flow opposed to the direction of arrow A.

FIG. 12 shows a flow control system which includes a processor 120, an inlet control valve 121, an outlet control valve 122 and with a dump control valve 123 (leading into a low pressure, e.g. atmospheric, drain) connected upstream of the outlet valve 122. In this embodiment the processor has two (high pressure) coolant channels 124a,124b respectively fed through coolant valves 125a,125b, though it could have more coolant channels, also in parallel.

Each of the valves 121,122,123 is a valve as herein described. Suitably the inlet/outlet control valves 121,122 are constructed generally as shown for the embodiments of FIG. 3 or FIG. 5, but alternatively are as FIG. 7 (and supplied in modular array as shown for the valve unit of FIG. 8), i.e. the valve closes when the pilot pressure is increased; whilst dump control valve 123 is constructed generally as shown in FIG. 10, i.e. the valve opens when the pilot pressure is increased.

Each valve 121,122,123 is controlled by, a single remote pilot valve 9 fed by a "flow or gate" arrangement 60, generally as described in relation to FIG. 6. Thus the pressure supplied to the pilot valve 9 is the higher of that in coolant line 119 and air line 126. In this embodiment, as a special feature, there is an additional separately operating "flow or gate" unit 160 which is fed by external pressure supplies 127 and 128 which can provide pressure to pilot 9 if the fluids in coolant line 119 and air, line 126 are contaminated or are otherwise unsuitable in the selected application for use as the pilot pressure fluid.

An additional "flow or gate" unit can be made similar to that of unit 60, or four one-way valves if suitably connected could be contained in one housing. An advantage of interconnecting two "flow or gates" 60,160 in parallel but with their exits connected, or with four one-way valves in a common housing, is that the highest pressure automatically acts at the pilot valve, so that an external pressure supply can be connected to one of the inlets 127 and 128 automatically to provide an alternative minimum threshold pilot pressure source and supply which will only act if the water line and air line pressures both fall below the threshold.

In use, the inlet 121 and outlet 122 control valves will normally be in the "open" condition (allowing flow from the respective valve inlet conduit to the outlet conduit), whilst dump valve 123 will be in the closed condition. If processor 120 is for instance an injection mould or equivalent which needs to have a regulated temperature throughout each process cycle, the coolant flow (from inlet control valve 121) can be interrupted as necessary by opening/closing respective valves 125a,125b, perhaps several times during a mould cycle as required, and as is well known in the art.

When processor 120 needs to be disconnected from the inlet valve 121, for example when an injection mould needs to be changed, then the inlet valve 121 needs first to be closed. However, following this a substantial volume of coolant is likely to remain in the processor. If the outlet valve 122 is itself connected to a low pressure drain it may be sufficient to close the outlet valve 122 after the inlet valve 121 has been closed, to allow sufficient of the trapped coolant to discharge for the pressure of the remaining coolant to drop to atmospheric; but often the coolant is in a closed loop, so that the "drain" pressure, i.e. that pressure existing at the outlet conduit 6 of the outlet valve 122 is itself above the ambient (atmospheric) pressure so that upon closure of both the inlet 121 and outlet 122 valves coolant under pressure is trapped in the coolant channels 124a,b of processor 120. In these circumstances it is desirable to open dump valve 123 so that the excess pressure in the channels 124a,b can be released, the dump valve 123 being opened no earlier than outlet valve 122 is closed.

If the pilot valve 9 is moved (in this embodiment rotated) from the "closed" position shown in FIG. 12 to an "open" position, the pressure from the "flow or gate" unit 60,160 is fed along portway 129 (shown in dotted lines) to inlet valve 121, then along portway 130 to outlet valve 122, and finally along portway 131 to dump valve 123. Thus, in this embodiment, the pilot pressure is fed from a single pilot valve 9 sequentially to the inlet valve, the outlet valve and the dump valve. In an alternative embodiment the pressure is fed simultaneously to these valves (by separate portways), and in another alternative embodiment separate pilot valves control each of the inlet 121, outlet 122 and dump 123 valves.

In this embodiment a flush valve 132 is also fitted, for flushing of the coolant passageways 124a,b of the processor 120. The valve 132, which can for instance be a valve according to FIG. 10, is normally in the closed condition, but is opened whilst the dump valve 123 is held open (preferably opening after and closing before the dump valve 123 has been opened/closed). The flush valve is connected to an air line 126; when opened the flush valve allows the air to expel the coolant from the channels 124a,b, which may be necessary or desirable prior to the processor being disconnected (e.g. for mould changing); for example, the coolant or other fluid to be expelled from the processor may in certain circumstances be hazardous, e.g. acidic. Also, it may be necessary or desirable to expel the coolant prior to the processor being left idle for an extended period such at a weekend or holiday period, during which time the coolant (or contaminants contained therein) resting in the channels might otherwise damage the channels. The flush valve may be connected to an inert gas line, or to another flushing fluid line, for a similar purpose.

The valves 125a,125b can be sequentially opened, to permit the flushing of channels 124a and 124b separately, to increase the likelihood of all or most of the coolant being expelled.

Thus some or all of the remaining coolant can be expelled e.g. blown out of the processor 120 before finally it is disconnected, whilst some of the coolant even then still remaining will flow out or will be removed as evaporated vapour. Rusting of the processor coolant channels can for example be reduced by removal of retained water by such air (or inert gas etc.) flushing.

It will be understood that the dump valve 123 is open whilst the flush valve 132 is open, so that the expelled coolant, and some of the flushing fluid, passes out of the dump valve 123.

The flush valve 132 will be closed no later than closure of dump valve 123. Following closure of the flush valve 132, the processor can then be safely disconnected, and without spillage of a significant quantity of coolant from the processor, much of which has been retained e.g. in a dump receptacle, for safe disposal or possible re-use. Preferably, the dump valve 123 remains open whilst the processor is disconnected.

We have found that the sequence of valve operation from the normal processor functioning (cooling) condition to the disconnection condition is readily accommodated by the valves as herein described, operated from a single pilot valve (especially if the operation is sequential as described, and from a remote pilot valve), but separate pilot valves for some or all of the control valves can be used if desired, in predetermined sequence. Specifically, the sequence could also be used whenever there is a production stoppage, or an inadvertent coolant pipe disconnection.

Thus, it is arranged that there are chokes in the portways 130 and 131 to cause a relative delay in the operation of the outlet valve 122 after operation of the inlet valve 121, and a further delay in the operation of the dump valve 123 after the outlet valve 122. Thus, after the pilot valve 9 has been opened, the inlet valve 121 is closed, with a short delay before the outlet valve 122 closes. This short delay allows the pressure in the coolant channels 124a,124b to fall from a pressure substantially equal to that of the coolant supply to a lower pressure between that of the coolant supply and the back pressure at the outlet valve 122. There is a further slight delay before the dump valve 123 is. opened, releasing the pressure from the coolant channels 124a,b.

When it is desired to reconnect the coolant supply, the pilot valve 9 is rotated to the position shown in FIG. 12, so that the portway 129 is connected either to atmosphere or to a source of pressure lower than that provided by the "flow or gate" 60,160 and sufficiently low to cause valves 121 and 122 to open, and valve 123 to close.

The inlet valve 121 opens first, introducing coolant to the channels 124a,b. For a short period of time, the outlet valve 122 remains closed whilst the dump valve remains open, so that the flushing fluid is forced out of the channels 124a,b and though the dump valve 123. Flushing fluid, and perhaps a small amount of coolant, can flow through the dump valve after the outlet valve 122 has opened and until the dump valve 123 is closed. It will be understood that the delays created in this system permit the removal of much or all of the flushing fluid such as air from the coolant circuit, which air might in extreme cases cause an air lock, for example.

It will be understood that in the system as described, the valve 122 cannot be a prior art diaphragm valve, since with such a diaphragm valve when the processor is disconnected, the back pressure would blow open the valve and permit reverse flow of coolant through valve 122. However, the valve as described herein permits the use of such an advantageous valve design in such a system, so increasing the utility of diaphragm-controlled valves, and so reducing the overall cost and complexity of such systems.

In addition, the valve 121 will need to be a valve assembly according to the invention if the flush line pressure is greater than the coolant supply pressure, since in such circumstances with a prior art diaphragm valve the higher pressure at its outlet conduit would blow open this valve, mixing flushing fluid with the coolant.

Furthermore, the flush valve 132 must be a valve assembly according to the invention if the coolant line pressure is greater than the flush line pressure, since in such circumstances with a prior art diaphragm valve the higher pressure at its outlet conduit would blow open this valve, forcing coolant into the flushing fluid line.

Although described in relation to a processor coolant, the system is equally applicable for a processor heatant or other treatment medium.

The pilot valve housing 51 could hold a multi-position pilot valve (or a plurality of pilot valves) instead of the three-way two-position (rotary) pilot valve 9. In one position such a pilot valve would not supply pressure to any of valves 121,122,123 and 132 (so that the valves 121 and 122 would be open and valves 123 and 132 would be closed; in a second position the pilot valve would supply pressure (sequentially) to valves 121,122 and 123 to close valves 121 and 122 and open valve 123; whilst in a third position the pilot valve would supply pressure to all of the valves, so that valves 121 and 122 remain closed and valve 123 remains open, and valve 132 is opened to flush the channels 124a,b.

In the described arrangement, valves 125a,125b are standard on-off valves connected to a manifold, or valves with an integral "Tee-piece" (FIG. 7) and which perhaps are connected or moulded together.

Figure 13:
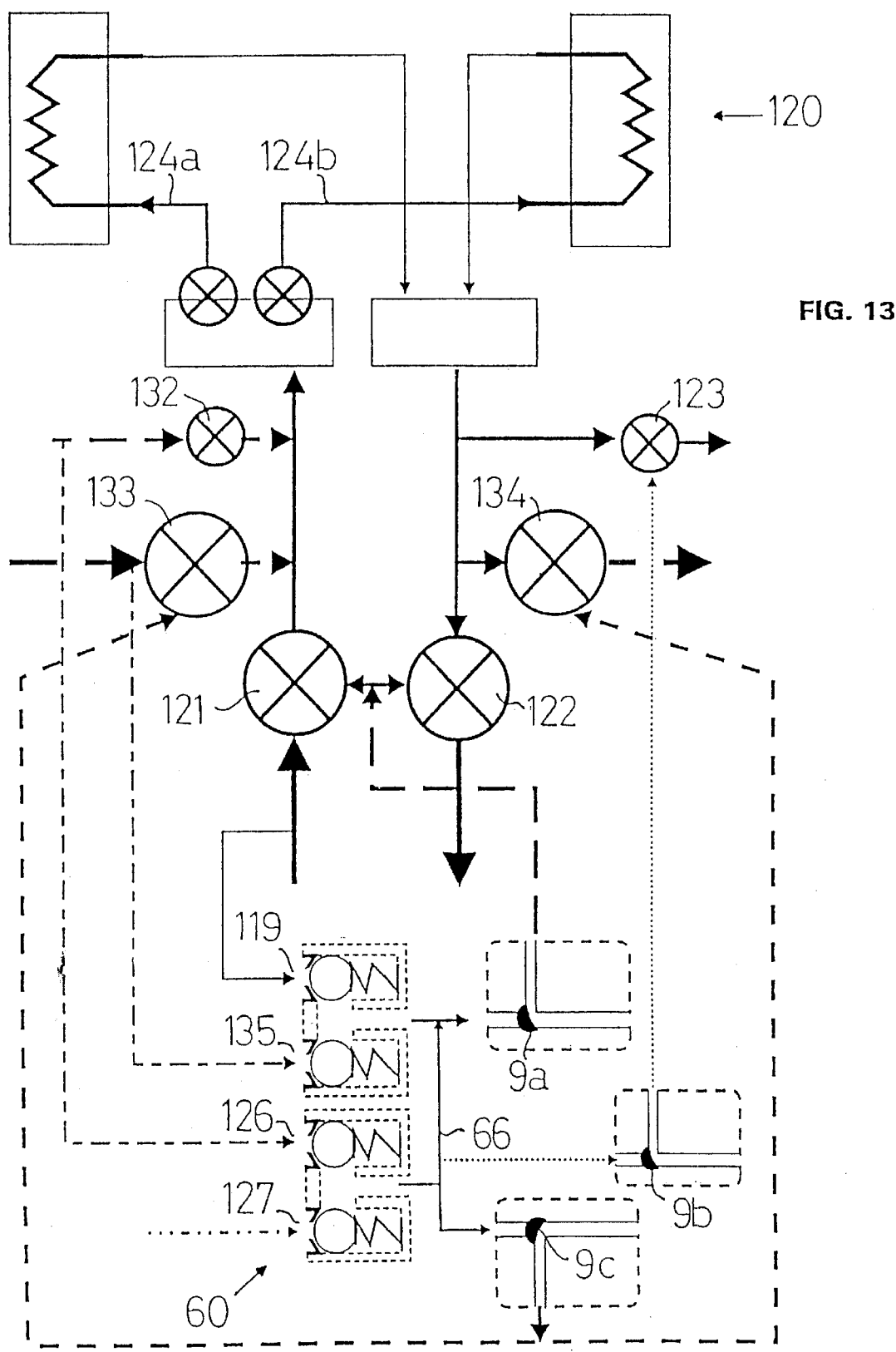
FIG. 13 is of a modified flow control system.

An alternative system is shown in FIG. 13. In this system, a pilot valve 9a is used to determine the open/closed condition of first coolant inlet/outlet valves 121,122, in this embodiment the valve 9a affecting both valves 121,122 substantially simultaneously. A separate pilot valve 9b is used to determine the open/closed condition of dump valve 123. A separately controlled flush valve 132 is provided, similarly to FIG. 12.

A third pilot valve 9c controls second coolant, inlet/outlet valves 133,134 respectively. Again in this embodiment the pilot valve 9c affecting the valves 133,134 substantially simultaneously. It is arranged that the inlet and outlet valves 121,122 for the first coolant and the inlet and outlet valves 133,134 for the second coolant, are not open together; thus, in this system, two separate coolants can alternatively be used in the processor. The first coolant may be water which has been cooled by a cooling tower or the like, the cost of which cooling is relatively low, so that the first coolant circulates through the channels 124a,b for most of the time. The second coolant may be water which is refrigerated by an external unit; the cost of cooling this water is relatively high, so that the refrigerated water is used only when the processor temperature is too high to be effectively cooled by the first coolant. Systems utilising two different coolants are known, but those systems do not Use diaphragm valves, since the relative pressures in the separate coolant systems will often be such as to render the prior art diaphragm valves liable to reverse flow, causing unwanted mixing of the coolants and wasting of the more expensive refrigerated coolant. However, such a system can operate with valves as described herein.

In one embodiment the pilot pressure to control the valves may be an external pressure which is guaranteed to be higher than all of {i} the first coolant supply, {ii} the second coolant supply, and {iii} the flushing fluid supply, so that unwanted reverse flow through any of the valves is prevented. However, FIG. 13 shows the preferred embodiment wherein a flow or gate 60 with four one-way valves. The exit of the flow or gate 60 is connected by separate lines to each pilot valve 9a,b,c. Inlet 119 is connected to the first coolant line, inlet 135 is connected to the second coolant line, inlet 126 is connected to the fluid flushing line, and 127 can be connected to an optional external pressure line.

In a preferred embodiment valves 121,133 and 132 are contained in one casing, and corresponding valves 122,134 and 123 in another casing, whilst the "flow or gate" housings 60,160 and the housings for pilot valves 9a,9b,9c are in a third casing, each casing being separately affixed to the processor, or to an operator's workstation for several processors which are being simultaneously controlled.

One advantage of our disclosure is that the processor 120 can be disconnected and reconnected e.g. with a replacement injection mould, with the processor channels already at ambient (usually atmospheric) pressure, and the pilot valve can then be moved to the position shown in FIG. 12. Another advantage is that the pilot valve (which may be operated by fluid pressure or electrically), or more importantly the actuator for the pilot valve, can be positioned remotely from the valves e.g. the actuator can be adjacent the operator's normal working position, not requiring the operator to move away from this normal working position (perhaps to an uncomfortable, perhaps more dangerous position) e.g. behind the machine to adjacent the control valves. A further advantage is that the actuator, needing only sufficient force to move or cause movement of the small pilot valve 9, does not require the force leverage (or consequential working space) needed for direct operation of mechanical control valves as previously used in such systems; furthermore, the small amount of energy required to operate the pilot valve (and thus the valves as described), means that the system can be automated, perhaps by a machine process which effects automatic closing off of the coolant system or systems, and flushing and venting of the coolant channels in the processor. Also, a machine process can automatically alternate the flow between one of two coolants, in accordance with an instantaneous processor temperature or adverse trend in processor temperature. Additional advantages are {i} that certain of the valves as described are bi-directional; {ii} that they can use a clean supply and so be maintained free of particulates and other contaminants; and {iii} that they can be used where the fluid flowing through the valve is unsuitable for controlling the valve, e.g. it is hazardous or biologically unsafe.

It will be understood that a valve according to FIG. 3 for example can be opened, and a valve according to FIG. 10 for example can be closed, by a pilot pressure lower than both the inlet and outlet pressures. For systems operating at close to atmospheric pressure, the pilot pressure could be slightly lower than atmospheric. One system which could utilise such an arrangement could be the coolant system of an internal combustion engine of a motor vehicle for example, in which the coolant also passes through a heat exchanger to provide warming air for the vehicle driver compartment. The coolant system of a vehicle typically operates at slightly above atmospheric pressure and a vacuum source is readily available at the engine inlet manifold. A valve according to FIG. 3, for example, could be used to open/close the supply of coolant to the heat exchanger dependent upon the actual and desired temperature within the driver compartment.

What is claimed is:

1. A valve system comprising:
   a) a housing having a hollow interior within an outer housing surface,
   b) a diaphragm extending across the hollow interior and creating a control chamber within the hollow interior,
   c) a valve seat against which a part of the diaphragm can seal,
   d) a first conduit leading around at least part of the valve seat,
   e) a second conduit leading to within the valve seat,
   f) a diaphragm control means for controlling the flow of fluid into the control chamber, wherein said control chamber is isolated from the first and second conduits,
   g) an inlet fluid conduit connected to one of the first and second conduits through which fluid can flow towards the diaphragm valve,
   h) a pressure selection means having an outlet connected to the control chamber, and a plurality of inlets, each inlet being connected to a respective pressure source, one of the inlets being connected to the inlet fluid conduit and another of the inlets being connected to an independent pressure source, each inlet having a pressure responsive means, the pressure responsive means of the inlet connected to the highest source pressure automatically communicating this pressure to the control chamber by way of the outlet.

2. The valve system according to claim 1 wherein the pressure selection means has at least two non-return valves, each non-return valve being connectable to a respective pressure source.

3. The valve system according to claim 1 wherein each pressure source is a respective fluid line, the fluids in the respective lines being dissimilar.

4. The valve system according to claim 3 wherein at least one of the fluids is compressible.

5. The valve system according to claim 1 further comprising an adjustment means for the diaphragm valve.

6. A valve system according to claim 1 wherein an outlet fluid conduit is connected to the other of the first and second conduits through which fluid can flow away from the diaphragm valve, and wherein a further inlet of the Pressure selection means is connected to the outlet fluid conduit.

7. A valve system according to claim 1 wherein the control chamber is isolated from at least one of the first and second conduits by the pressure selection means and the diaphragm control means.

8. A valve system according to claim 1 wherein the diaphragm control means is located between the pressure selection means and the control chamber.

9. A flow control system for a processor which includes a processor inlet valve and a processor outlet valve, at least one of the processor inlet valve and outlet valve forming part of a valve system which comprises:

a) a diaphragm valve including:
        (1) a housing having a hollow interior within an outer housing surface,
        (2) a diaphragm extending across the hollow interior and creating a control chamber within the hollow interior,
        (3) a valve seat against which a part of the diaphragm can seal,
        (4) a first conduit leading around at least part of the valve seat,
        (5) a second conduit leading to within the valve seat, and
        (6) a diaphragm control means for controlling the flow of fluid into the control chamber, wherein said control chamber is isolated from the first and second conduits, the valve system further comprising
    b) an inlet fluid conduit connected to one of the first and second conduits through which fluid can flow towards the diaphragm valve, and
    c) a pressure selection means having an outlet connected to the control chamber, and a plurality of inlets, each inlet being connected to a respective pressure source, one of the inlets being connected to the inlet fluid conduit and another of the inlets being connected to an independent pressure source, each inlet having a pressure responsive means, the pressure responsive means of the inlet connected to the highest source pressure automatically communicating this pressure to the control chamber by way of the outlet.

10. The flow control system for a processor according to claim 6 wherein at least one pressure source is a fluid line connected to a processor fluid supply.

11. The flow control system for a processor according to claim 9, further comprising a processor dump valve connected upstream of the processor outlet valve, at least the processor outlet valve and the processor dump valve being controlled by a single pilot valve located between the outlet of the pressure selection means and the control chamber, whereby the processor dump valve can be in the closed condition when the processor inlet and outlet valves are in the open condition and whereby the processor dump valve can be in the open condition when the processor inlet and outlet valves are in the closed condition.

12. The flow control system for a processor according to claim 11 wherein the processor inlet valve is also controlled by the single pilot valve.

13. The flow control system for a processor according to claim 12 wherein said processor inlet, outlet and dump valves are controlled, sequentially or substantially simultaneously, by the single pilot valve.

14. The flow control system for a processor according to claim 6 wherein said processor inlet valve is a first processor inlet valve and said processor outlet valve is a first processor outlet valve, the first processor inlet valve and the first processor outlet valve being connected to a first fluid supply, and wherein a second processor inlet valve and a second processor outlet valve are provided, the second processor inlet valve and the second processor outlet valve being connected to a second fluid supply, the first and second fluid supplies being connected to respective first and second inlets of the pressure selection means.

\* \* \* \* \*